US012647067B2

(12) United States Patent

Renaud-Byrne et al.

(10) Patent No.: US 12,647,067 B2

(45) Date of Patent: Jun. 2, 2026

(54) FLEXIBLE MODULAR SOLAR PANEL

(71) Applicant: Hybrid Power Solutions, Etobicoke (CA)

(72) Inventors: Francois Renaud-Byrne, Etobicoke (CA); Xiongyi Cui, Etobicoke (CA); Shane Power, Etobicoke (CA)

( * ) Notice: Subject to any disclaimer, the term of this patent is extended or adjusted under 35 U.S.C. 154(b) by 0 days.

(21) Appl. No.: 18/665,404

(22) Filed: May 15, 2024

(65) Prior Publication Data

US 2024/0388245 A1 Nov. 21, 2024

Related U.S. Application Data

(60) Provisional application No. 63/502,315, filed on May 15, 2023.

(51) Int. Cl.
*H02S 30/20* (2014.01)
*H02S 20/32* (2014.01)
*H02S 40/36* (2014.01)
*H02S 40/42* (2014.01)

(52) U.S. Cl.
CPC .............. *H02S 30/20* (2014.12); *H02S 20/32* (2014.12); *H02S 40/36* (2014.12); *H02S 40/425* (2014.12)

(58) Field of Classification Search
CPC ..................... H02S 20/00–32; H02S 30/00–20
USPC ................................................ 136/243–265
See application file for complete search history.

(56) References Cited

U.S. PATENT DOCUMENTS

| | | | | |
|---|---|---|---|---|
| 2011/0048495 A1* | 3/2011 | Peddada | ................. | H02S 40/42 |
| | | | | 136/246 |
| 2012/0073625 A1* | 3/2012 | Christensen | .......... | F24S 30/455 |
| | | | | 136/246 |
| 2013/0085729 A1* | 4/2013 | Tsuruta | ................... | H02S 50/10 |
| | | | | 703/2 |
| 2013/0098436 A1* | 4/2013 | Connor | ................. | H10K 30/50 |
| | | | | 977/948 |
| 2014/0230882 A1* | 8/2014 | Hingley | ................. | H02S 40/38 |
| | | | | 136/245 |
| 2014/0315599 A1* | 10/2014 | Teichmann | ............. | H02S 20/32 |
| | | | | 136/246 |
| 2020/0266759 A1* | 8/2020 | Okawa | .................... | H02S 40/34 |

FOREIGN PATENT DOCUMENTS

| | | | | | |
|---|---|---|---|---|---|
| CN | 107508550 A | * | 12/2017 | ............ | H02S 50/10 |
| CN | 210724677 U | * | 6/2020 | | |
| JP | H0625020 | * | 6/1994 | | |
| KR | 102074673 B1 | * | 2/2020 | | |
| KR | 20220072960 A | * | 6/2022 | | |

(Continued)

OTHER PUBLICATIONS

KR-102074673-B1 English (Year: 2020).*

(Continued)

*Primary Examiner* — Bach T Dinh

(57) ABSTRACT

A flexible modular solar panel, including: a flexible fabric-based membrane; and a plurality of solar cell modules attached to the flexible fabric-based membrane, wherein: each solar cell module comprises a plurality of photovoltaic cells; each solar cell module comprises at least one connector for connecting to at least one other solar cell module; and the flexible modular solar panel is connected to a load to store or directly deliver energy.

19 Claims, 10 Drawing Sheets

(56)          References Cited

FOREIGN PATENT DOCUMENTS

WO      WO-2019230019  A1  *  12/2019    ............. B32B 15/08
WO      WO-2022221167  A1  *  10/2022    ................ H02J 1/14

OTHER PUBLICATIONS

KR-20220072960-A English (Year: 2022).*
JPH0625020 English (Year: 1994).*
CN-210724677-U English (Year: 2020).*
CN-107508550-A English (Year: 2017).*

* cited by examiner

FIG. 8A
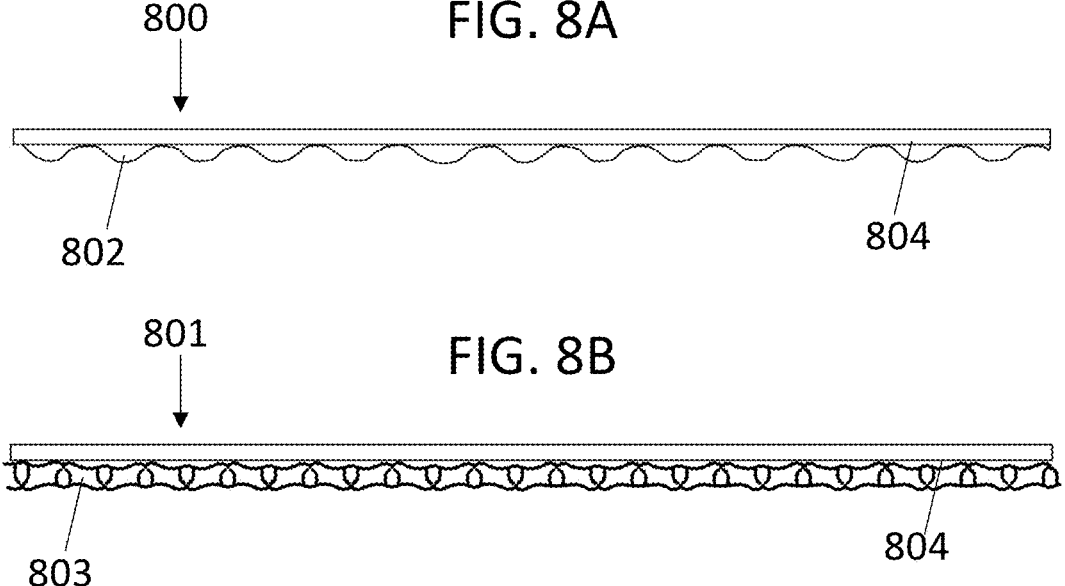
FIG. 8B
FIG. 8C
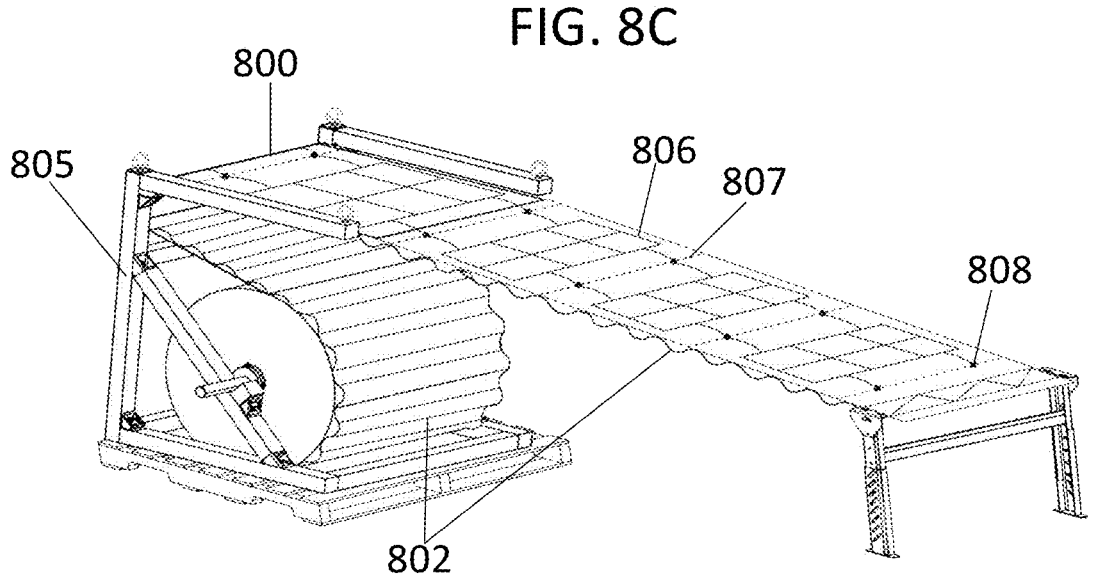

FLEXIBLE MODULAR SOLAR PANEL

FIELD OF THE DISCLOSURE

The present invention generally relates to solar energy technologies, and more specifically, to flexible modular solar panels.

BACKGROUND

The utilization of solar energy for various applications has gained significant traction in recent years due to its environmental sustainability and renewable nature. Traditional solar panel systems typically consist of rigid, fixed assemblies, which may pose limitations in terms of installation flexibility and portability.

It is known in the art that the aforementioned limitations are overcome by providing modular, flexible, and transportable solar cell assemblies. These assemblies incorporate a plurality of either thin film, monocrystalline or polycrystalline solar cells arranged in a generally flat and planar configuration, thereby maximizing solar energy absorption while ensuring adaptability to diverse mounting surfaces and environments. However, current flexible modular solar panels remain limited by low wattage/power limits, low efficiency solar energy conversion rates, tendencies to overheat, and inflexibility for a user to modify the shape of the panels. As such, an improved flexible modular solar panel is needed.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments provide a flexible modular solar panel, including: a flexible fabric-based membrane; and a plurality of solar cell modules attached to the flexible fabric-based membrane, wherein: each solar cell module comprises a plurality of photovoltaic cells; each solar cell module comprises at least one connector for connecting to at least one other solar cell module; and the flexible modular solar panel is connected to a load to store or directly deliver energy.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5A-5B illustrate an example of flexible modular solar panels, each rolled onto a frame for transport and deployment from a utility trailer, according to some embodiments.

FIGS. 8A-8C illustrate an example of flexible modular solar panels, each with a heat sink, according to some embodiments.

DETAILED DESCRIPTION OF SOME EMBODIMENTS

Figure 1:
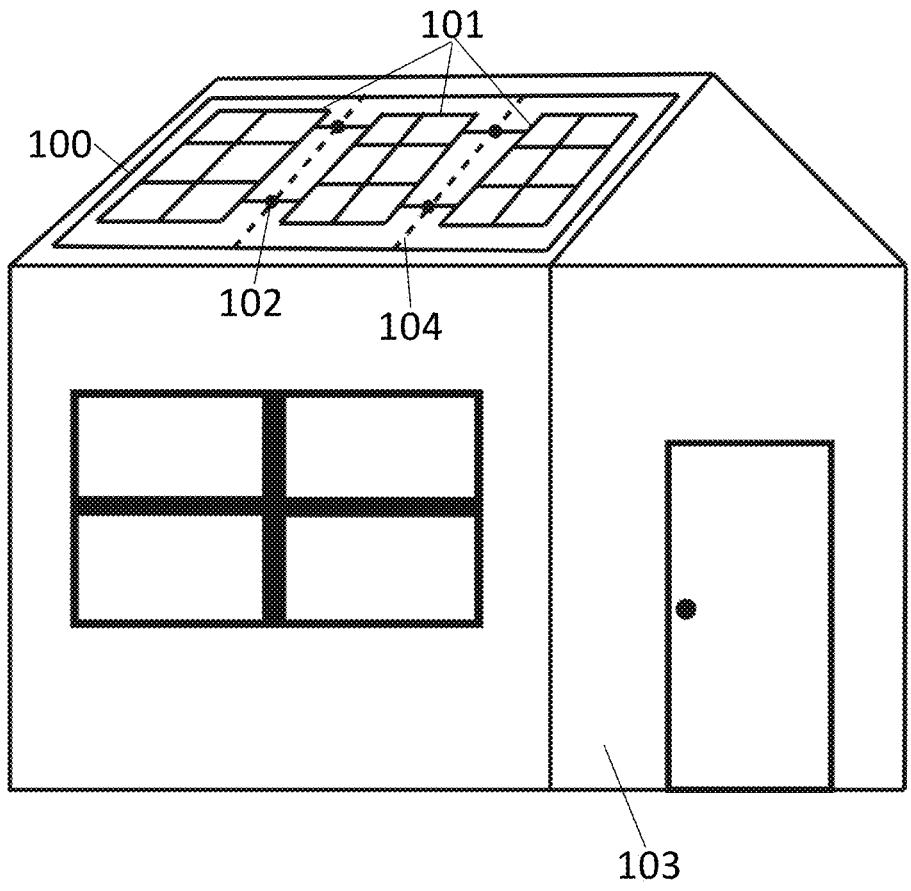
FIG. 1 illustrates an example of a flexible modular solar panel mounted on a roof of a house, according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Aspects of the invention include a flexible modular solar panel including at least a flexible fabric-based membrane, rigid or flexible photovoltaic (PV) cells (e.g., thin film, polycrystalline or monocrystalline silicon PV cells or another type of PV cells) grouped together to form at least one solar cell module, a means for easy and quick connection/disconnection between solar cell modules forming an array of solar cell modules, and a plurality of elements for safety monitoring and optimization of the flexible modular solar panel.

Elements for safety monitoring include at least rapid shutdown devices, fuses, and diodes. Rapid shutdown devices are used to stop or reduce voltage and current from PV cells of a solar cell module. Fuses limit the current flowing in an electric circuit and when the current in the circuit is increased beyond the limit, the fuse burns and prevents electrical components within the circuit from damage. Diodes facilitate the flow of electrical current in one direction and protect circuits and electrical components within the circuit from reversing currents. The means for easy and quick connection/disconnection between solar cell modules also provides a safe means for a user to assemble the array of solar cell modules.

Elements for optimization include at least solar panel optimizers. Solar panel optimizers improve the overall efficiency of a system of flexible modular solar panels, maximizing power output from the system by overcoming deficiencies caused by shading, different panel orientations, and uneven degradation. Solar panel optimizers permit each flexible modular solar panel to operate independently. Therefore, when one flexible modular solar panel is impacted by shading, the remaining flexible modular solar panels of the system continue functioning at full capacity. Solar panel optimizers are also able to deal with energy generated from different panel angles using maximum power point tracking (MPPT), wherein each flexible modular solar panel is tracked rather than an entire string of flexible modular solar panels. Solar panel optimizers also provide performance monitoring and disconnection on a per-panel basis.

The flexible modular solar panel is assembled by at least one of sewing, adhering, and/or embedding solar cell modules, the means for connection/disconnection, and the plurality of elements onto or within the flexible fabric-based membrane. In some embodiments, the means for connection/disconnection comprises one or more quick connectors (e.g., male and female quick connectors), wherein two solar cell modules may be connected or disconnected by connecting or disconnecting their quick connectors to or from one another, respectively. In some embodiments, the means for connection/disconnection and/or other electrical connections within the flexible modular solar panel are spring loaded to support applied stresses from bending or stretching motions, such as stresses arising from high winds that may act to pull two solar cell modules apart or flex the flexible modular solar panel. In cases where the means for connection/disconnection and/or other electrical connections within the flexible modular solar panel are intolerant of stresses, a stress relief structure may be added.

The flexible modular solar panel assembly is modular in size. For example, solar cell modules may be connected and disconnected by a user using a quick release plug and the flexible modular solar panel may be divided into at least two smaller flexible modular solar panels by the user to achieve a specific sized array of solar cell modules. In some embodiments, the user cuts the flexible fabric-based membrane to which the solar cell modules are attached to obtain a specific sized array of solar cell modules. In some embodiments, dividing the flexible modular solar panel into at least two smaller flexible modular solar panels does not require cutting through any electrical wiring. In one embodiment, possible shapes (e.g., rectangle, triangle, and other geometrical or freeform shapes) and sizes of one or more solar cell modules are predetermined based on at least visible lines on the flexible fabric-based membrane, of which the user may cut along to obtain specific shape and size of an array of solar cell modules. In another embodiment, possible shapes and sizes are predetermined based on perforates lines on the flexible fabric-based membrane, of which the user may forcibly pull along to obtain the specific shape and size of arrays of solar cell modules. Other means for dividing the flexible modular solar panel into two or more flexible modular solar panels may be used, such as zippers. Each shape may be a self-contained array of solar cell modules that may be connected to or disconnected from other arrays of solar cell modules.

In some embodiments, flexible heat sinks are attached to solar cell modules to prevent overheating by transferring heat away from the solar cell modules. The flexible heat sinks may comprise a copper mesh or other thermally conductive material attached to the solar cell modules. In some embodiments, the flexible modular solar panel comprises corrugated channels positioned adjacent to the solar cell modules that offer flexibility in at least one axis and allow for natural convective cooling of the solar cell modules. Heat may also be dissipated using a highly technical fabric as the flexible fabric-based membrane. In one embodiment, water may be used as a heat sink, wherein water runs adjacent to the solar cell modules, transferring heat from the solar cell modules to the water. For instance, tubing may be distributed adjacent to the solar cell modules and water may be pumped through the tubing. Other methods for positioning and flowing water adjacent to the solar cell modules may be used. As heat is transferred to the water, the temperature of the water rises. In some cases, the heated water may be used for a separate application or purpose (e.g., heating a pool).

In some embodiments, the flexible modular solar panel width ranges between 0.1 to 2 meters, while the length ranges between 1 to 10 meters. In some embodiments, a distance between solar cell modules of the flexible modular solar panel ranges between 0.01 to 0.1 meters such that the flexible modular solar panel is foldable. In some embodiments, the flexible modular solar panel generates a voltage up to 1000V for residential dwellings. In some embodiments, the flexible modular solar panel generates a wattage of at least 100 W. The power drawn from the flexible modular solar panel may be used to electrical devices (e.g., tools, heater, etc.), stored in a battery for later use, or delivered to a power grid.

In some embodiments, the fabric-based membrane is fabricated of a polymer. In some embodiments, the fabric-based membrane is knitted, woven or non-woven, needled, felt, and/or another type of fabric. The fabric-based membrane may comprise one or more layers of fabric and each layer of fabric may include a same or different type and/or composition of the other layers of fabric. Various layers of fabric may be attached to one another by adhesive, lamination, weaving, needling, knitting, or another means. In some embodiments, one or more layers of the fabric-based membrane acts as an electrical conductor for transferring current from the PV cells to a load. In some embodiments, the flexible fabric-based membrane is translucent to increase the wattage capability by up to 30%, referred to as bifacial gain.

The flexible modular solar panel may be shipped and transported either in a roll or folded within a box on a standard shipping pallet. A top surface of the solar cell modules of the flexible solar panel may face inwards or outwards when the flexible modular solar panel is rolled up. The fabric-based membrane is lightweight and allows for easier handling of the flexible modular solar panel during shipping and delivery.

In operation, the modularity of the flexible modular solar panel allows the user to create solar cell arrays to a custom size depending on the application. This is achieved through the easy and quick means for connections/disconnection between the solar cell modules and the easy divisibility of the flexible fabric-based membrane. The flexible modular solar panel has thermal properties that allow for use in various applications. For example, the flexible modular solar panel may be mounted or bound directly to a surface such as a roof, wood mount, or other structure in a similar means as a traditional hard solar panel would be. In another example, the flexible modular solar panel may be mounted or hung from a frame in a similar fashion to a curtain. In some embodiments, the flexible modular solar panel may be mounted to a foldable steel frame that is easily shipped and moved using a forklift or crane, wherein the foldable steel frame may include specially designed forklift slots and lift points. Since the flexible modular solar panel is flexible, the flexible modular solar panel and the foldable steel frame may be assembled together at a manufacturing facility, folded/collapsed for shipment, and readily deployed on site at a fraction of the time required to achieve the same for a traditional hard structured solar panel.

In some embodiments, one or more flexible modular solar panels are fixed to a roof or another surface using a variety of fasteners including straps, cabling, nails, or other fastening means. In some embodiments, the one or more flexible modular solar panels stored as a roll is unrolled and affixed to one or more frames for rapid deployment. For example, in some embodiments, one or more flexible modular solar panels are transported and deployed from a purpose built or regular utility trailer. Each flexible modular solar panel may be transported as a roll mounted on a support structure and may be deployed by unrolling the roll of the flexible modular solar panel to expose a desired number of solar cell modules. A free end of each unrolled flexible modular solar panel may be attached to one or more ground frames or poles disposed at a distance from the trailer to stabilize and support each unrolled flexible modular solar panel. Each flexible modular solar panel may be angled by adjusting the support structure on which each roll of flexible modular solar panel is mounted and/or the one or more ground frames or poles for optimal efficiency. Once solar power generation is no longer required, each flexible modular solar panel may be rapidly detached from the one or more ground frames or poles and rolled back up for transport to a next location. In other examples, the one or more flexible modular solar panels are deployed for use in other industries. For instance, the one or more flexible modular solar panels may be attached to and/or deployed from a crane, a sea or train container, a roof, a transport truck, a vehicle at a construction site, etc.

In some embodiments, the flexible modular solar panel and/or a structure to which the flexible modular solar panel is attached may be actuated to move in a direction of the sun using a first mechanical device attached thereto. The first mechanical device causing movement of the flexible modular solar panel and/or the structure to which the flexible modular solar panel is attached may be controlled using a remote control, an application of a communication device (e.g., smart phone, tablet, laptop, etc.), or another communication means. In some embodiments, the first mechanical device is automatically actuated based on sensor data. For example, the flexible modular solar panel and/or the structure to which the flexible modular solar panel is attached may include sensors disposed at various positions on the flexible modular solar panel and/or the structure that capture data indicative of an amount of sunlight. In some embodiments, the first mechanical device is automatically actuated based on a geographical location of the flexible modular solar panel and a path of the sun corresponding to the geographical location or a location of the sun.

A memory may store program code that when executed by a processor effectuates operations including at least one of: obtaining sensor data; and actuating the first mechanical device based on the sensor data and/or a path of the sun corresponding to a geographical location of the flexible modular solar panel to cause movement of the flexible modular solar panel and/or structure to which the flexible modular solar panel is attached such that the flexible modular solar panel receives a maximum amount of sunlight. The operations may further include: receiving the geographical location from an application of a communication device, wherein the user provides input to the application designating the geographical location. The operations may further include: extracting the geographical location based on sensor data captured by a sensor disposed on the flexible modular solar panel, such as a global positioning system. The operations may further include: extracting the path of the sun based on the geographic location. In some embodiments, the first mechanical device includes at least one motor and at least one motor controller. The at least one motor controller may start and stop the at least one motor, control forward or reverse rotation of the at least one motor, regulate the speed of the at least one motor, regulate or limit the torque of the at least one motor, and protect against overloads and electrical faults. In one example, a motor controller may cause a motor to rotate in a first direction, the rotation of which causes a structure to which a flexible modular solar panel is attached to also rotate in the first direction, thereby adjusting an orientation or angle (e.g., polar and azimuthal angles) of the flexible modular solar panel. Multiple motors may be implemented to achieve multiple degrees of freedom for adjustment of orientation and angle of the flexible modular solar panel.

In some embodiments, the flexible modular solar panel is deployed and retracted based on user command, weather conditions, power requirements, etc. In some embodiments, the flexible modular solar panel may be actuated to deploy and retract using a second mechanical device attached thereto. The second mechanical device causing deployment and retraction of the flexible modular solar panel may be controlled using a remote control, an application of a communication device, or another communication means. In some embodiments, the second mechanical device automatically deploys and retracts the flexible modular solar panel based on sensor data. For example, the flexible modular solar panel or a load attached thereto may include a sensor that captures data indicative of an amount of energy stored or power available. The second mechanical device may automatically deploy the flexible solar panel when an amount of energy stored or power available is below a threshold and/or retract the flexible modular solar panel when the amount of energy stored or the power available is above a threshold. In some embodiments, the second mechanical device automatically deploys and retracts the flexible modular solar panel based on weather conditions. For example, the second mechanical device automatically deploys the flexible solar panel when sun is forecasted or sensor data indicates sunlight and/or retracts the flexible modular solar panel when rain is forecasted or sensor data indicates a lack of sunlight.

The memory may store program code that when executed by the processor effectuates operations including at least one of: obtaining sensor data; and actuating the second mechanical device to deploy or retract the flexible modular solar panel based on the sensor data and/or weather forecast corresponding to a geographical location of the flexible modular solar panel. The operations may further include: receiving the geographical location and energy or power thresholds for deploying and retracting the flexible modular solar panel from an application of a communication device, wherein the user provides inputs to the application designating the geographical location and the energy or power thresholds. The operations may further include: extracting the geographical location based on sensor data captured by a sensor disposed on the flexible modular solar panel, such as a global positioning system. The operations may further include: extracting the weather forecast based on the geographic location. In some embodiments, the second mechanical device includes at least one motor and at least one motor controller. The at least one motor controller may start and stop the at least one motor, control forward or reverse rotation of the at least one motor, regulate the speed of the at least one motor, regulate or limit the torque of the at least one motor, and protect against overloads and electrical faults. In one example, wherein the flexible modular solar panel is wound around a cylinder, a motor controller may cause a motor to rotate in a first direction, the rotation of which causes the cylinder to also rotate in the first direction. As the cylinder rotates in the first direction the flexible modular solar panel unrolls, deploying. The motor controller may cause the motor to rotate in a second direction, the rotation of which causes the cylinder to also rotate in the second direction. As the cylinder rotates in the second direction the flexible modular solar panel rolls back around the cylinder, retracting. A free end of the flexible modular solar panel may be attached to rails or a frame to guide the flexible modular solar panel as it is unrolled and deployed.

FIG. 1 illustrates an example of a flexible modular solar panel 100 including solar cell modules 101 connected to one another using quick connectors 102. The solar cell modules 101 are mounted on a house 103. The flexible modular solar panel 100 is folded along lines 104 for easy shipping or storage on, for example, a pallet. The flexible modular solar panel 100 may also be divided (e.g., cut, torn, etc.) along lines 104 to obtain desirable sizes of a plurality of flexible modular solar panels. The division also required the disconnection of appropriate quick connectors 102.

Figure 2:
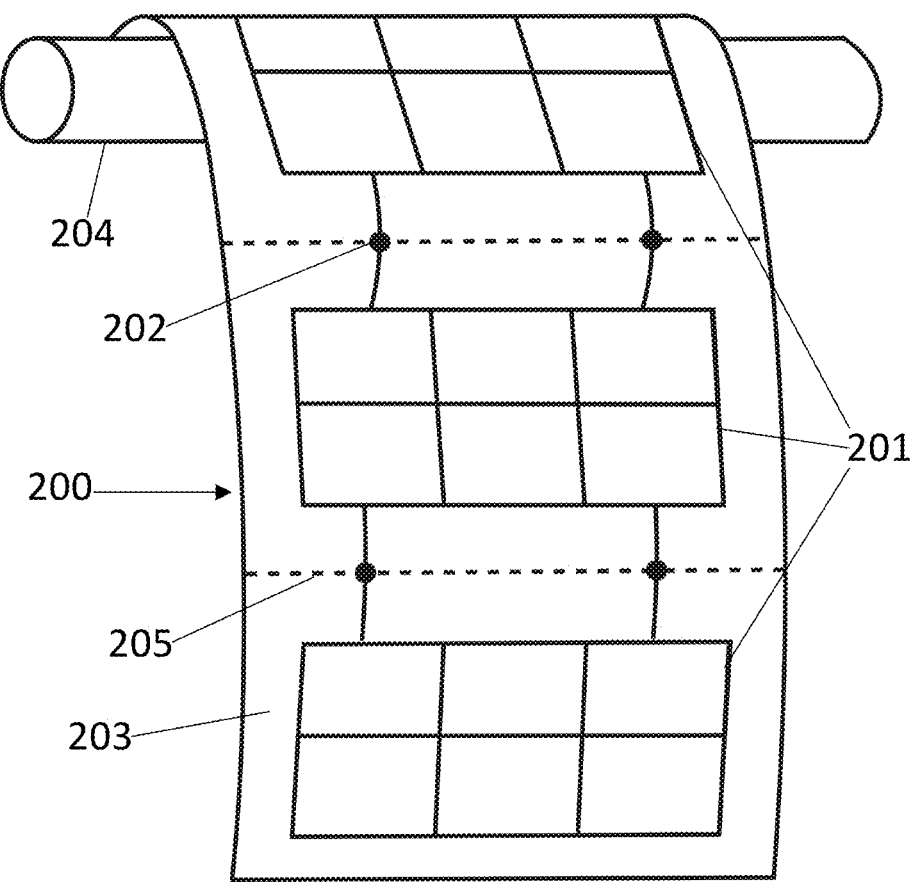
FIG. 2 illustrates an example of a flexible modular solar panel rolled onto a cylinder, according to some embodiments.

FIG. 2 illustrates an example of a flexible modular solar panel 200 including solar cell modules 201 connected to one another using quick connectors 202. The solar cell modules 201 are embedded in a flexible fabric-based membrane 203. The flexible modular solar panel 200 may be rolled onto or unrolled from cylinder 204. The cylinder 204 and/or the flexible modular solar panel 200 may be hung such that the solar cell modules 201 are exposed to the sun. The flexible modular solar panel 200 may be rolled up onto cylinder 204 and easily stored and moved to another location. The flexible modular solar panel 200 may also be folded along lines 205 or divided along lines 205 into multiple flexible modular solar panels with custom sizes. The division also required the disconnection of appropriate quick connectors 202.

Figure 3:
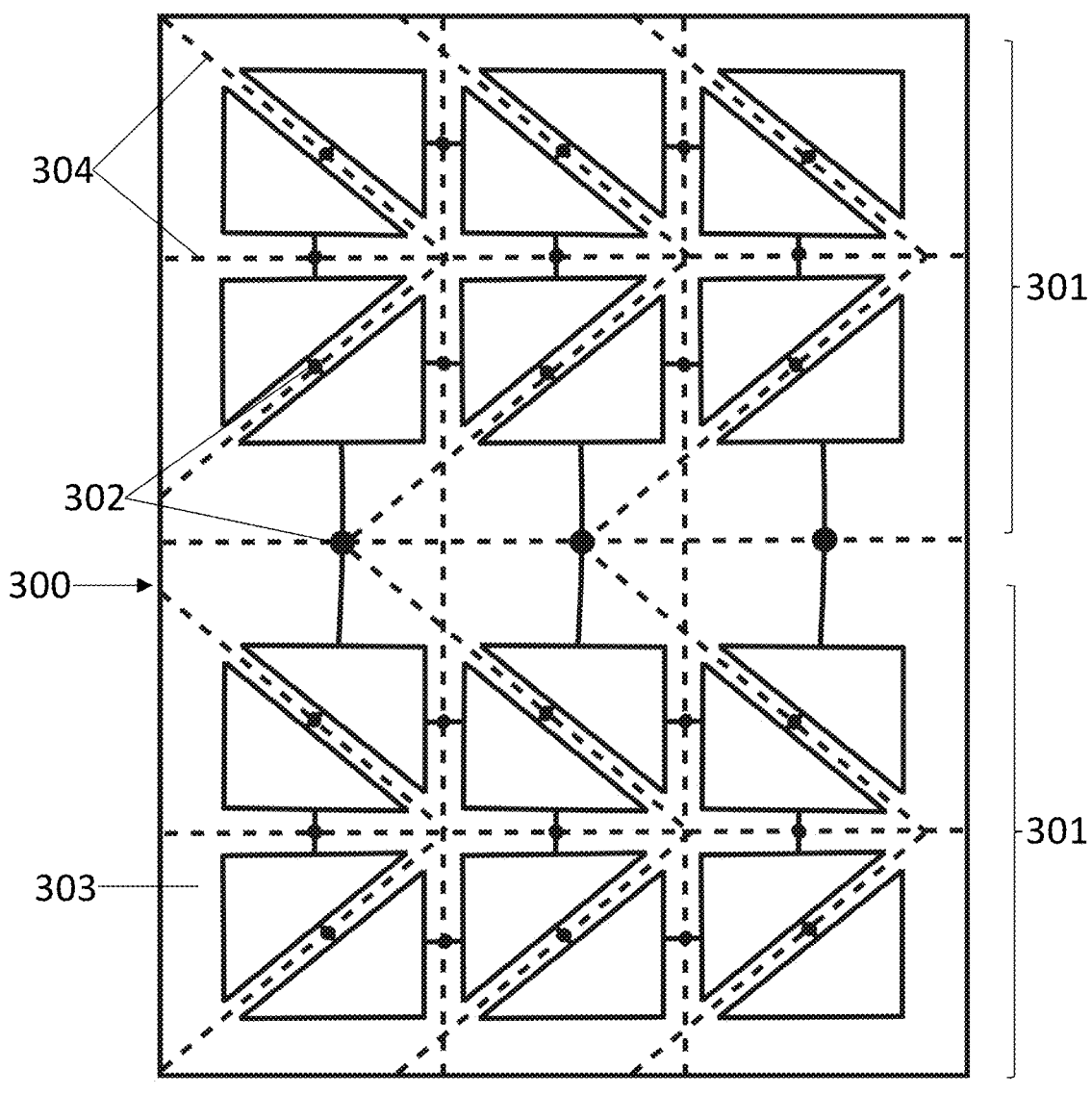
FIG. 3 illustrates an example of a flexible modular solar panel including an array of triangular solar cell modules, according to some embodiments.

FIG. 3 illustrates an example of a flexible modular solar panel 300 including solar cell modules 301 connected to one another using quick connectors 302. The solar cell modules 301 are embedded in a flexible fabric-based membrane 303. The flexible modular solar panel 300 may be folded along the various lines 304 or divided along the various lines 304 to obtain a customized flexible modular solar panel shape. The division also required the disconnection of appropriate quick connectors 302.

Figure 4:
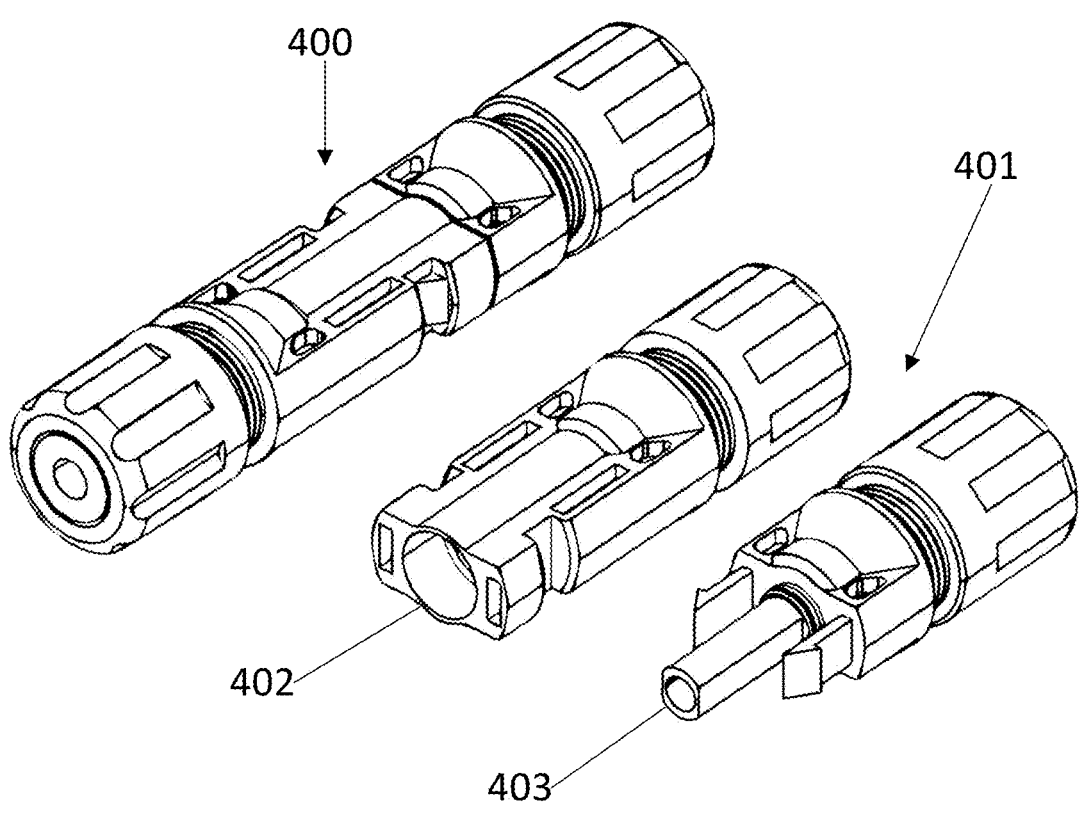
FIG. 4 illustrates an example of a standard PV cell connector, according to some embodiments.

FIG. 4 illustrates an example of a standard PV cell quick connecter, both assembled 400 and disassembled 401. The quick connector includes a male connector 402 and a female connector 403 which may be implemented in the flexible modular solar panels described above as a quick connector between solar cells.

Figure 5A:
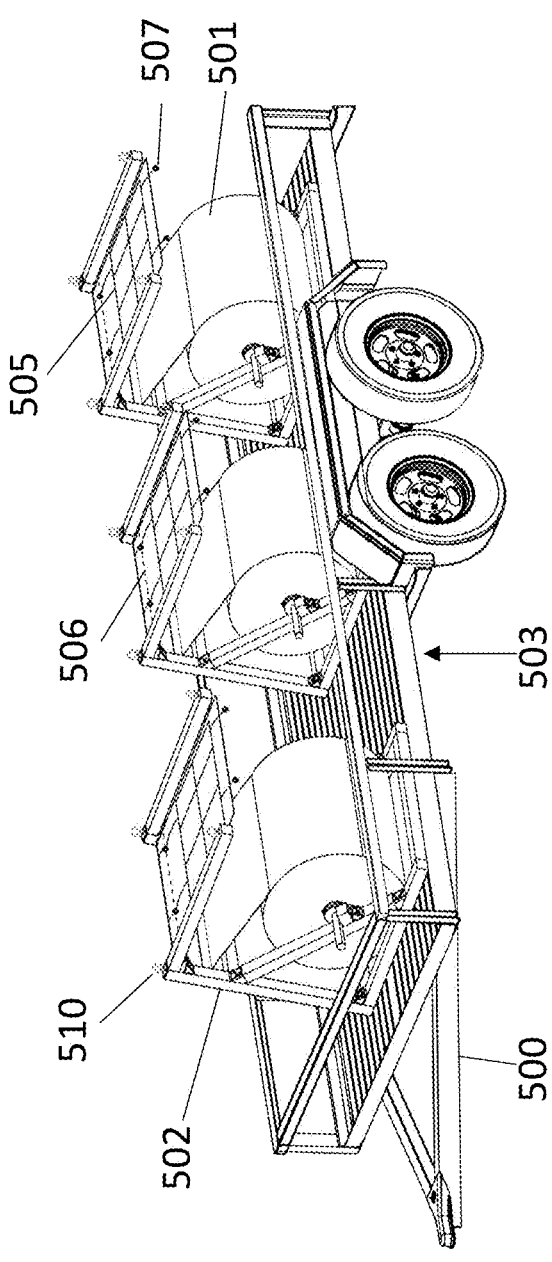
Figure 5B:
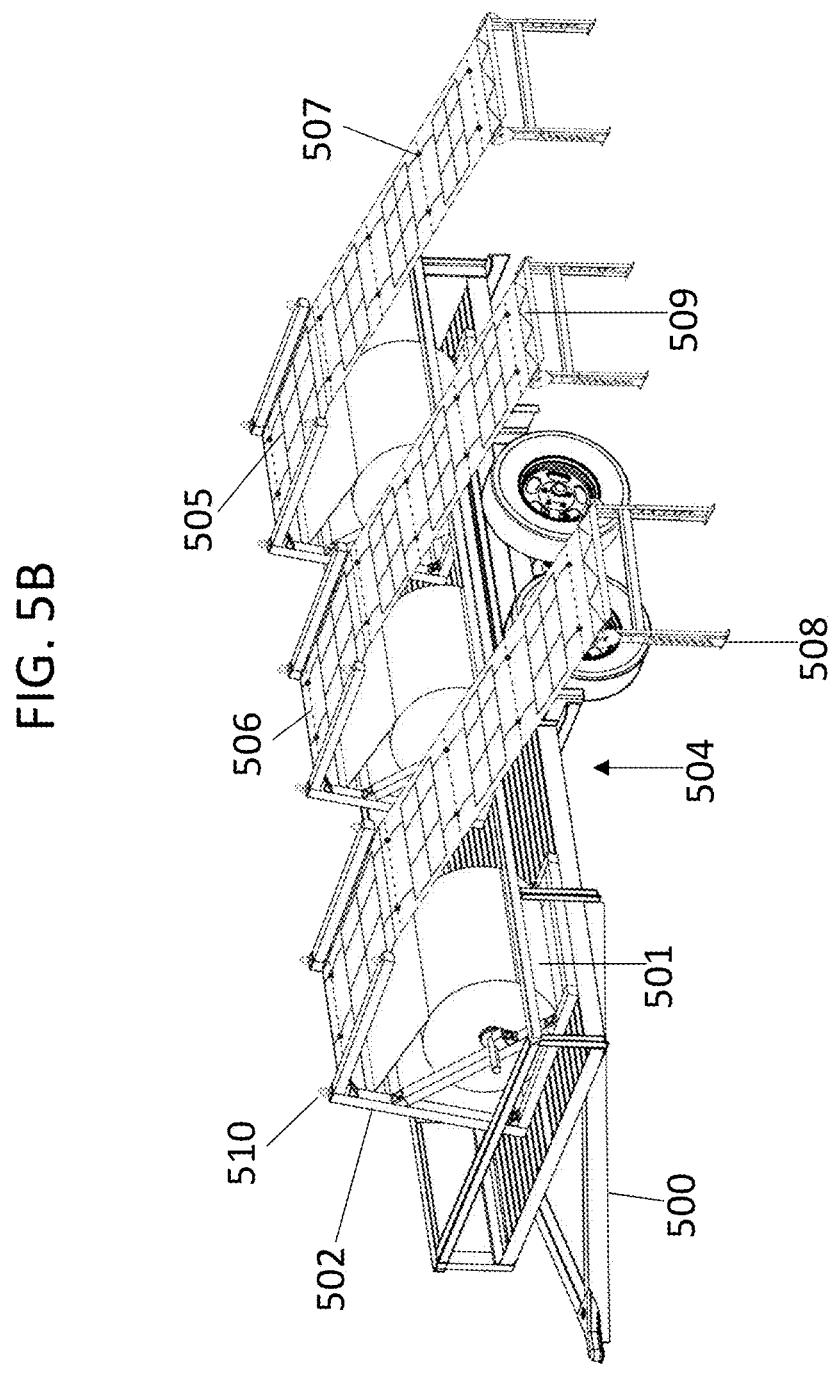

FIGS. 5A-5B illustrate an example of a utility trailer 500 carrying flexible modular solar panels 501 rolled on frames 502 in both retracted 503 and deployed 504 states, respectively. As shown in this example, solar cell modules 505, lines 506, and quick connectors 507 are facing the inside of their respective roll and are exposed when deployed and pulled away from the frame 502. In the deployed state, a ground frame 508 may be used to stabilize any deployed portions of a respective flexible modular solar panel 501 attached thereto with clamps 509 and adjust an angle of any deployed portions of the respective flexible module solar panels 501 for optimum solar energy harnessing efficiency. The frames 503 and utility trailer 500 may also be used to adjust orientation or angle of any deployed portions of flexible modular solar panels 501. The frames 502 include eye lift hooks 510 allowing for the frames 502 to be lifted on and off the utility trailer 500.

Figure 6A:
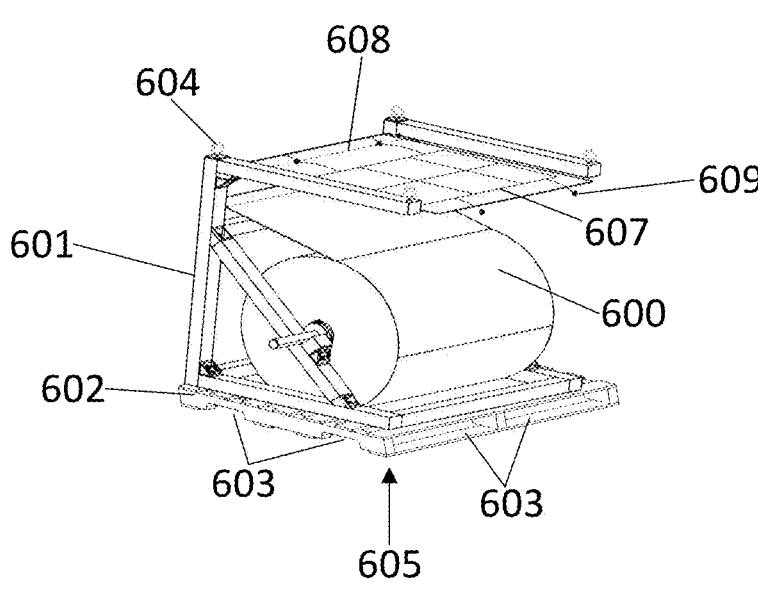
FIGS. 6A-6B illustrate an example of flexible modular solar panels, each rolled onto a frame disposed on a liftable platform, according to some embodiments.
Figure 6B:
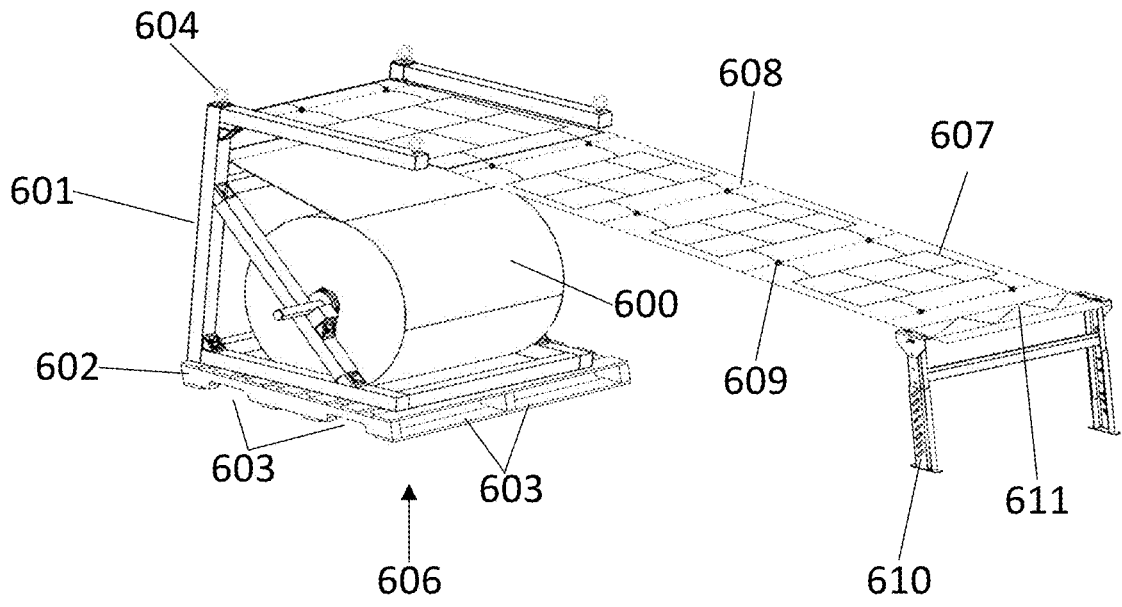

FIGS. 6A-6B illustrate an example of a flexible modular solar panel 600 rolled on a frame 601 disposed or mounted on a platform 602 (e.g. pallet). The frame 601 and platform 602 is lifted from forklift pockets 603 or using eye lift hooks 604 in both retracted 605 and deployed 606 states. As shown in this example, solar cell modules 607, lines 608, and quick connectors 609 are facing the inside of the roll and are exposed when deployed and pulled away from the frame 602. In the deployed state, a ground frame 610 is used to stabilize any deployed portions of the flexible modular solar panel 600 attached thereto with clamps 611 and adjust the angle of any deployed portions of the flexible module solar panel 600 for optimum solar energy harnessing efficiency.

Figures 7A, 7B:
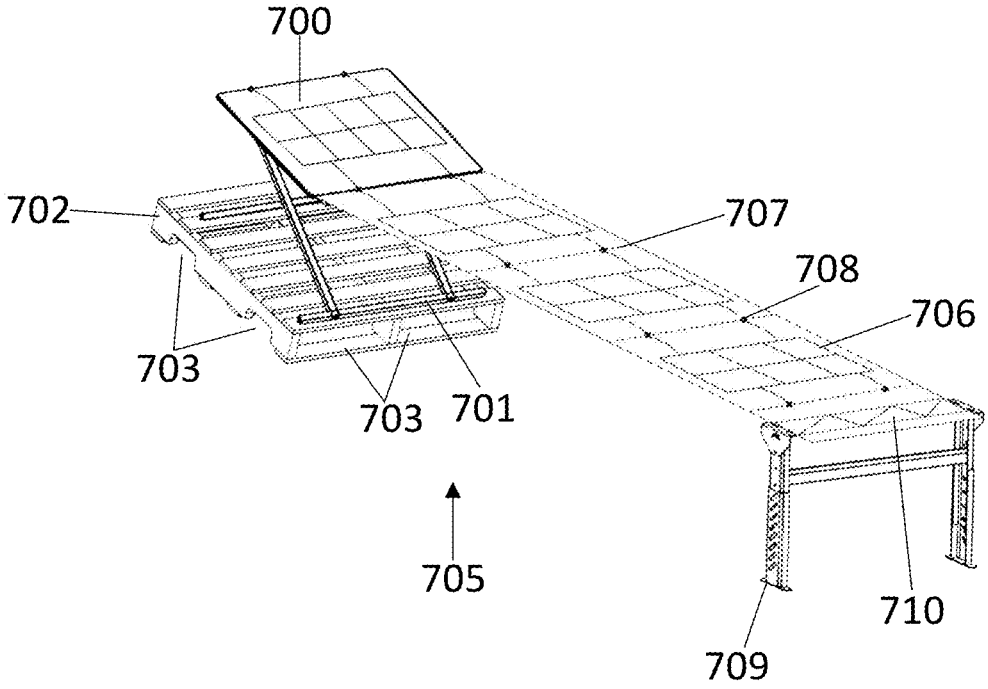
FIGS. 7A-7B illustrate an example of flexible modular solar panels folded onto a foldable steel frame, according to some embodiments.

FIGS. 7A-7B illustrate an example of a flexible modular solar panel 700 folded on a foldable frame 701 disposed or mounted on a platform 702. The foldable frame 701 and platform 702 are lifted from forklift pockets 703 in both retracted 704 and deployed 705 states. As shown in FIG. 7B, solar cell modules 706, fold lines 707, and quick connectors 708 of the flexible modular solar panel 700 can be unfolded and exposed. In the deployed state, a ground frame 709 is used to stabilize any deployed portions of the flexible modular solar panel 700 attached thereto using clamps 710 and adjust the angle of any deployed portions of the flexible module solar panel 700 for optimum solar energy harnessing efficiency. The foldable frame 701 may also be used to adjust orientation or angle of any deployed portions of the flexible modular solar panel 700.

FIGS. 8A-8B illustrate cross-sectional examples of flexible modular solar panels 800 and 801 with heat sinks including corrugated channels 802 and copper mesh 803, respectively. Both the corrugated channels 802 and the copper mesh 803 are attached to a bottom of a fabric-based membrane 804 of the flexible modular solar panel 800 and 801, respectively. FIG. 8C illustrates an example of the flexible modular solar panel 800 with corrugated channels 802 rolled on a frame 805 in a deployed state. As shown in FIG. 8C, solar cell modules 806, lines 807, and quick connectors 808 are facing the inside of the roll and the corrugated channels 802 are facing outwards from a center on the roll until deployed.

Figure 9:
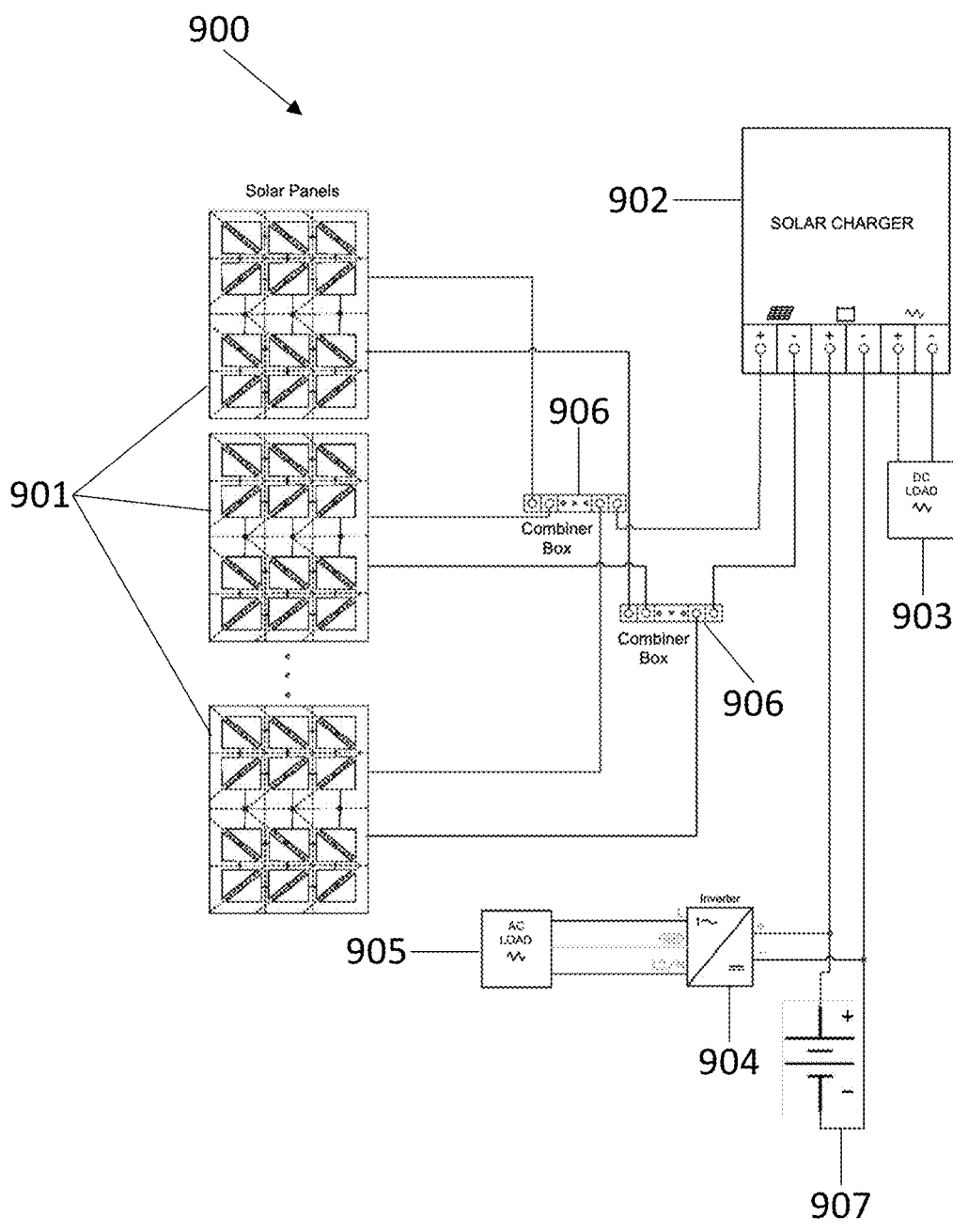
FIG. 9 illustrates an example of an electrical circuit diagram for a solar energy system including multiple flexible modular solar panels, according to some embodiments.

FIG. 9 illustrates an example of an electrical circuit diagram 900 for a solar energy system including multiple flexible modular solar panels 901, a solar charger 902, a DC load 903, an inverter 904, an AC load 905, combiner boxes 906, and a battery 907.

Some embodiments provide a solar panel system comprising the flexible modular solar panel and a battery pack to which the flexible modular solar panel is connected to. In some embodiments, a user interface is configured to display a total amount of energy generated, an amount of energy generated by each array of solar cell modules and/or each solar cell module, malfunctions, warning messages, a total operation time, an operation time of each array of solar cell modules and/or each solar cell module, sensor data, temperature data, weather forecast, predicted energy generation based on at least the weather forecast, efficiency rating, a predicted efficiency rating based on at least the weather forecast, a suggestion to move a flexible modular solar panel to a particular location to improve efficiency, and a suggested orientation or angle of a flexible modular solar panel to use for maximum efficiency. In some embodiments, the user interface is configured to receive at least one input designating an instruction to turn on or turn off a particular array of solar cell modules or a solar cell module, an instruction to perform a health check, a schedule for charging or discharging batteries of the battery pack, and an instruction to adjust an orientation or an angle of a flexible modular solar panel or at least one solar cell module thereof. In some embodiments, the user interface comprises at least one of a user interface of an application of a computing device (e.g., a smart phone, a laptop, a tablet, etc.) and a user interface disposed on the battery pack.

In some embodiments, the solar panel system comprises a processor communicatively coupled with the application of the communication device and/or the user interface disposed on the battery pack and a media storing instructions that when executed by the processor effectuates operations (e.g., instructions designated by the at least one input received by the user interface). In some embodiments, the processor determines and actuates implementation of optimal settings of the solar panel system based on historical settings used and the performance metrics achieved, historical weather and the performance metrics achieved, and historical geographic location and performance metrics achieved. In some embodiments, the processor uses machine learning to determine the most optimal settings. Settings may include an orientation or angle of a flexible modular solar panel, specifically polar and azimuthal angles of the flexible modular solar panel, and a geographical location to set up the flexible modular solar panel. Performance metrics may include a total amount of energy generated within a time period and an amount of energy generated by each solar cell module within a time period.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A flexible modular solar panel, comprising:
a flexible fabric-based membrane;
a plurality of solar cell modules attached to the flexible fabric-based membrane, wherein:
    each solar cell module comprises a plurality of photovoltaic cells;
    each solar cell module comprises at least one connector for connecting to at least one other solar cell module; and
    the flexible modular solar panel is connected to a load to store or directly deliver energy;
a processor; and
a media storing instructions that when executed by the processor effectuates operations encoded in the instructions;
wherein:
    the processor is communicatively coupled with an application of a smartphone;
    a user interface of the application is configured to:
        display each of: malfunctions, warning messages, a total operation time, an operation time of each array of solar cell modules or each solar cell module, sensor data, temperature data, a predicted energy generation, an efficiency rating, and a suggested orientation or angle of a flexible modular solar panel to use for maximum efficiency; and
        receive at least one input designating: an instruction to turn on or turn off a particular array of solar cell modules or a solar cell module, an instruction to perform a health check, a schedule for charging or discharging batteries of the battery pack, and an instruction to adjust an orientation or an angle of a flexible modular solar panel or at least one solar cell module thereof;
    the operations comprise implementing the instruction to turn on or turn off the particular array of solar cell modules or the solar cell module, the instruction to perform a health check, the schedule for charging or discharging batteries of the battery pack, and the instruction to adjust the orientation or the angle of the flexible modular solar panel or the at least one solar cell module thereof.

2. The flexible modular solar panel of claim 1, further comprising:
at least one rapid shutdown device;
a plurality of solar optimizers;
a plurality of diodes; and
a plurality of fuses.

3. The flexible modular solar panel of claim 1, wherein the plurality of the solar cell modules are embedded within the flexible fabric-based membrane.

4. The flexible modular solar panel of claim 1, wherein:
the flexible modular solar panel is divided into two smaller sized flexible modular solar panels by separating a portion of the flexible fabric-based membrane to which at least one solar cell module is attached from a remaining portion of the flexible fabric-based membrane to which the remaining solar cell modules are attached; and
the flexible modular solar panel is divided into the two smaller sized flexible modular solar panels without cutting through any electrical wiring.

5. The flexible modular solar panel of claim 4, wherein the flexible modular solar panel is further divided into the two smaller sized flexible modular solar panels by disconnecting at least one connector of at least one solar cell module from at least one connector of each solar cell module to which the at least one solar cell module is connected.

6. The flexible modular solar panel of claim 4, wherein: predetermined shapes and sizes of the two smaller sized flexible modular solar panels are at least partially outlined by visible lines on the flexible fabric-based membrane; and the portion of the flexible fabric-based membrane is separated from the remaining portion of the flexible fabric-based membrane by cutting along the visible lines.

7. The flexible modular solar panel of claim 4, wherein: predetermined shapes and sizes of the two smaller sized flexible modular solar panels are at least partially outlined by perforated lines in the flexible fabric-based membrane; and the portion of the flexible fabric-based membrane is separated from the remaining portion of the flexible fabric-based membrane by forcibly pulling the portion of the flexible fabric-based membrane from the remaining portion of the flexible fabric-based membrane along the perforated lines.

8. The flexible modular solar panel of claim 1, wherein a new at least one solar cell module is added to the flexible modular solar panel by connecting at least one connector of the new at least one solar cell module to at least one connector of at least one solar cell module of the plurality of solar cell modules.

9. The flexible modular solar panel of claim 1, further comprising at least one wire mesh fabricated of thermally conductive material.

10. The flexible modular solar panel of claim 1, further comprising a plurality of corrugated channels.

11. The flexible modular solar panel of claim 1, wherein at least one of:

the flexible fabric-based membrane comprises a technical fabric fabricated to dissipate heat; and the flexible fabric-based membrane is translucent.

12. The flexible modular solar panel of claim 1, wherein: the flexible modular solar panel is wound around a cylinder into a roll; and a desired number of solar cell modules are deployed by unrolling the flexible modular solar panel to expose the desired number of solar cell modules.

13. The flexible modular solar panel of claim 12, wherein the deployed solar cell modules are supported using at least one ground frame.

14. The flexible modular solar panel of claim 1, wherein: the user interface of the application is further configured to:

display each of: a total amount of energy generated, an amount of energy generated by each array of solar cell modules or each solar cell module, a weather forecast, a predicted energy generation based on at least the weather forecast, and a predicted efficiency rating based on at least the weather forecast.

15. The flexible modular solar panel of claim 1, wherein the operations comprise:

determining optimal settings of the flexible modular solar panel based on at least one of:

historical settings used and the performance metrics achieved, historical weather and the performance metrics achieved, and historical geographic location and the performance metrics achieved; and implementing the optimal settings.

16. The flexible modular solar panel of claim 15, wherein: the optimal settings comprise an orientation or angle of a flexible modular solar panel; and the performance metrics comprise at least one of: a total amount of energy generated within a time period and an amount of energy generated by each solar cell module within a time period.

17. The flexible modular solar panel of claim 15, wherein machine learning is used to determine the optimal settings.

18. The flexible modular solar panel of claim 1, wherein: the flexible modular solar panel further comprises a first mechanical device;

the first mechanical device comprises at least: a motor and a motor controller;

the first mechanical device autonomously adjusts polar and azimuthal angles of the flexible modular solar panel to maximize an amount of sunlight received by the flexible modular solar panel; and the operations comprise:

determining the polar and azimuthal angles based on at least one of: sensor data, a geographical location of the flexible modular solar panel, and a location of the sun; and actuating the first mechanical device to implement the polar and azimuthal angles.

19. The flexible modular solar panel of claim 1, wherein: the flexible modular solar panel further comprises a second mechanical device;

the second mechanical device comprises at least: a motor and a motor controller;

the second mechanical device autonomously deploys and retracts the flexible modular solar panel; and the operations comprise:

determining whether to deploy or retract the flexible modular solar panel based on at least one of: sensor data indicative of an amount of energy stored or power available and weather conditions; and actuating the second mechanical device to deploy or retract the flexible modular solar panel.

* * * * *